C. H. MATTHIESSEN.
OPEN-THILLS.

No. 170,634.  Patented Nov. 30, 1875.

WITNESSES:
C. Neveux
Alex T. Roberts

INVENTOR,
C. H. Matthiessen
BY
Munn
ATTORNEYS.

UNITED STATES PATENT OFFICE.

CONRAD H. MATTHIESSEN, OF ODELL, ILLINOIS.

IMPROVEMENT IN OPEN THILLS.

Specification forming part of Letters Patent No. 170,634, dated November 30, 1875; application filed November 13, 1875.

*To all whom it may concern:*

Figure 1:
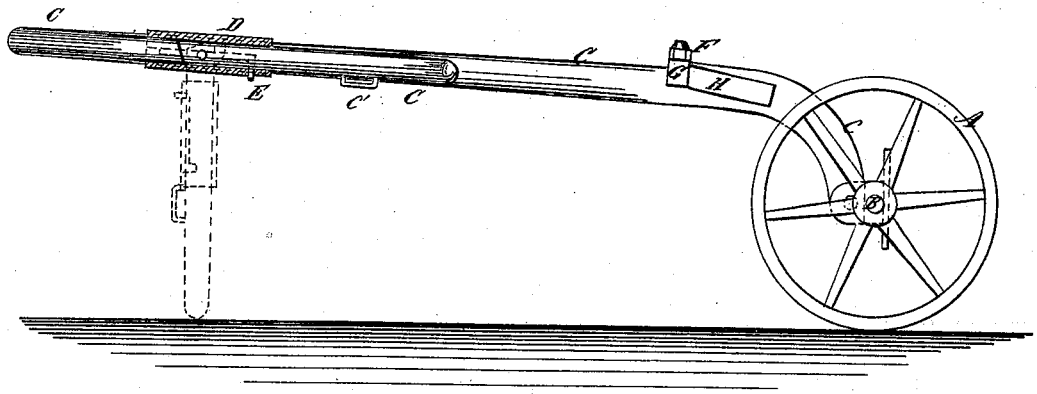
Figure 2:
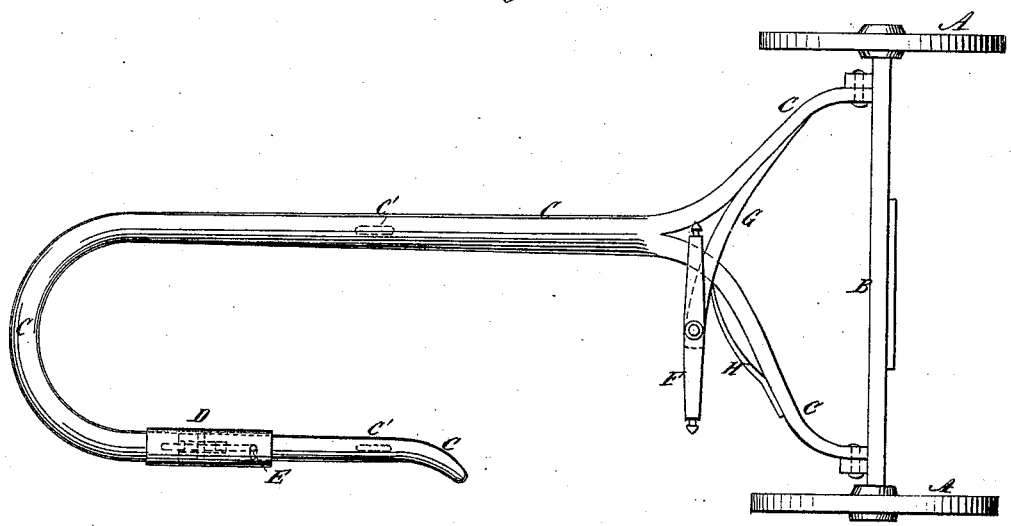

Be it known that I, CONRAD H. MATTHIESSEN, of Odell, in the county of Livingston and State of Illinois, have invented a new and useful Improvement in Open-Side Thill, of which the following is a specification:

Figure 1 is a side view of my improved open-side thill, shown as applied to the forward axle of a wagon. Fig. 2 is a top view of the same.

Similar letters of reference indicate corresponding parts.

The object of this invention is to enable the horse drawing a single or one-horse wagon or sleigh to travel in the regular track in roads where double or two-horse teams are principally used, and at the same time allow the vehicle to follow the regular track, thus saving the jolting, enabling the horse to travel easier, and avoiding the straining and wrenching of the vehicle, which are unavoidable when using the ordinary thills upon such roads.

The invention consists in the single thill having its forward end curved to pass around the breast of the horse and receive the thill-carrier; in the joint formed in the free end of the curved thill; and in the combination of the bar or arm with the branched rear end of the open-side thill to receive the whiffletree, as hereinafter fully described.

A represents the forward wheels, and B the forward axle of a wagon, about the construction of which parts there is nothing new. C represents the thill, the rear end of which is forked or branched, and the ends of said branches are connected with the axle B by ordinary thill-clips. This brings the body of the thill about in line with the center of the vehicle, so as to be over the ridge between the two tracks in the road. The forward part of the thill C is curved into U-shape, as shown in Fig. 2, so as to pass around the horse's breast and to the body of the thill, and to its end part are attached loops c', into which the thill-carriers of the harness are buckled. The free end of the thill C has a joint formed in it, at such a distance from the end, and in such a way, that the said free end may be turned down to rest upon the ground to support the thill in proper position while bringing the horse into position, and harnessing and unharnessing him. The jointed end of the thill C is secured in place, when raised into position for use, by a sliding ferrule or band, D, kept in place by a pin, E, attached to said thill, and entering an angular or bayonet slot formed in the said ferrule D. F is the whiffletree, which is pivoted to the end of a bar, G, attached to the forked end of the thill and projecting so as to be in the rear of the horse.

The bar G may be strengthened by a brace, H, if desired.

Having thus described my invention, I claim as new and desire to secure by Letters Patent—

1. The single thill C, having its forward end curved to pass around the breast of the horse and receive the thill-carrier, substantially as herein shown and described.

2. The joint formed in the free end of the curved thill C, substantially as herein shown and described.

3. The combination of the bar or arm G with the branched rear end of the open-side thill C, to receive the whiffletree F, substantially as herein shown and described.

CONRAD H. MATTHIESSEN.

Witnesses:
   A. P. WRIGHT,
   C. A. VINCENT.